United States Patent
Kodali et al.

(10) Patent No.: US 9,591,661 B2
(45) Date of Patent: Mar. 7, 2017

(54) REDUCING SCHEDULING REQUESTS BY A WIRELESS COMMUNICATION DEVICE TRANSMITTING VOICE DATA OVER DYNAMICALLY SCHEDULED RESOURCES

(71) Applicant: Apple Inc., Cupertino, CA (US)

(72) Inventors: Sree Ram Kodali, Sunnyvale, CA (US); Shivesh Makharia, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/076,100

(22) Filed: Nov. 8, 2013

(65) Prior Publication Data

US 2014/0135027 A1    May 15, 2014

Related U.S. Application Data

(60) Provisional application No. 61/724,857, filed on Nov. 9, 2012.

(51) Int. Cl.

| | |
|---|---|
| *H04W 72/00* | (2009.01) |
| *H04W 36/00* | (2009.01) |
| *H04B 15/00* | (2006.01) |
| *H04W 4/00* | (2009.01) |
| *H04L 12/26* | (2006.01) |
| *H04W 72/12* | (2009.01) |

(52) U.S. Cl.
CPC ............................. *H04W 72/1278* (2013.01)

(58) Field of Classification Search
CPC ...... H04W 72/04; H04W 24/00; H04W 36/20
See application file for complete search history.

(56) References Cited

U.S. PATENT DOCUMENTS

| | | | | |
|---|---|---|---|---|
| 2002/0009054 A1* | 1/2002 | Suzuki | ............... | H04L 12/6418 370/252 |
| 2010/0284354 A1* | 11/2010 | Ostergaard | ........ | H04W 72/1284 370/329 |
| 2010/0322169 A1* | 12/2010 | Narasimha | ........ | H04W 72/0493 370/329 |
| 2011/0255492 A1* | 10/2011 | Dai | ................... | H04W 72/1284 370/329 |

(Continued)

*Primary Examiner* — Tammy Paige Goddard
*Assistant Examiner* — Frantz Bataille
(74) *Attorney, Agent, or Firm* — Downey Brand LLP

(57) ABSTRACT

A method for reducing scheduling requests by a wireless communication device transmitting data using dynamically scheduled resources over a logical channel is provided. The method includes receiving, at the wireless communication device, a configuration from a network entity that sets a LogicalChannelSR-Mask for a logical channel for which uplink resources can be dynamically scheduled by the wireless network. The method further includes waiting to send a scheduling request (SR) for a delay time period when data is available to be sent on the logical channel and uplink resources have not been granted. The method additionally includes using the grant to send the data without sending an SR when a grant is received within the delay time period; or sending an SR when a grant is not received within the delay time period. In another method, a network selectively enables or disables SRs for a logical channel through explicit signaling.

20 Claims, 7 Drawing Sheets

(56) References Cited

U.S. PATENT DOCUMENTS

| | | | |
|---|---|---|---|
| 2011/0305197 A1* | 12/2011 | Park | H04L 1/1812 370/328 |
| 2012/0033628 A1* | 2/2012 | Eriksson | H04W 72/1284 370/329 |
| 2012/0250631 A1* | 10/2012 | Hakola | H04L 5/001 370/329 |
| 2013/0021995 A1 | 1/2013 | Ehsan et al. | |
| 2013/0083702 A1 | 4/2013 | Barany et al. | |
| 2013/0100936 A1 | 4/2013 | Pettersson | |

* cited by examiner

REDUCING SCHEDULING REQUESTS BY A WIRELESS COMMUNICATION DEVICE TRANSMITTING VOICE DATA OVER DYNAMICALLY SCHEDULED RESOURCES

CROSS-REFERENCE TO RELATED APPLICATIONS

This application claims the benefit of U.S. Provisional Application No. 61/724,857, filed Nov. 9, 2012 and entitled "REDUCING SCHEDULING REQUESTS BY A WIRELESS COMMUNICATION DEVICE TRANSMITTING VOICE DATA OVER DYNAMICALLY SCHEDULED RESOURCES," which is incorporated by reference herein in its entirety for all purposes.

TECHNICAL FIELD

The described embodiments relate generally to wireless communications and more particularly to reducing scheduling requests by a wireless communication device that transmits data over dynamically scheduled resources.

BACKGROUND

Some wireless networks, such as wireless networks that operate in accordance with a Long Term Evolution (LTE) wireless communication protocol, can use dynamic scheduling to assign to a wireless communication device radio frequency resources for an access network portion of the wireless network. When using dynamic scheduling, the wireless network can assign radio frequency resources to the wireless communication device on an as-needed basis. In this regard, if the wireless communication device has data to send in an uplink direction to the wireless network, the wireless communication device can send a scheduling request (SR) to the wireless network, and the wireless network can allocate appropriate uplink radio frequency resources to the wireless communication device on which to communicate the data. Dynamic scheduling can provide benefits to the wireless network, (e.g., greater scheduling flexibility for the wireless network to assign radio frequency resources to multiple wireless communication devices that share the same cell), compared with other scheduling schemes, such as semi-persistent scheduling (SPS) in which specific, periodic radio frequency resources can be dedicated to a particular wireless communication device for communication. In this regard, the flexibility provided by dynamic scheduling can enable the wireless network to perform frequency hopping, load balancing, and/or other measures that can enable the wireless network to dynamically adjust resource allocations assigned to different wireless communication devices to accommodate changing wireless network conditions.

In some wireless networks, dynamic scheduling can be used for wireless communication devices that transmit voice data. However, requiring a wireless communication device to send a scheduling request (SR) to the wireless network each time that the wireless communication device has voice data to send, which can occur frequently during a voice connection, can waste signaling resources, including, for example, Physical Uplink Control Channel (PUCCH) signaling resources to convey the SR to the wireless network and physical downlink control channel (PDCCH) signaling resources used to covey the grant to the wireless communication device. Some wireless networks configure wireless communication devices to avoid SR transmission entirely to avoid wasting signaling resources in an instance in which voice data is being transmitted on an uplink channel. However, disabling SR entirely for a wireless communication device does not provide an optimum solution for wireless communication devices with one or more additional active logical uplink channels in addition to a logical voice channel. In this regard, it can be desirable for SR transmission to be used for requesting resources for signaling channels and data (e.g., non-voice data) channels even when voice data is being transmitted on a logical voice channel.

SUMMARY OF THE DESCRIBED EMBODIMENTS

The described embodiments relate generally to wireless communications and more particularly to reducing scheduling requests by a wireless communication device that transmits data over dynamically scheduled resources. In an embodiment, a method to reduce scheduling requests by a wireless communication device using dynamically scheduled resources includes the following steps. The wireless communication device sends data over a logical channel using uplink radio resources assigned in grants provided by a wireless network, where scheduling requests by the wireless communication device are disabled by the wireless network. The wireless communication device receives a first signaling message from the wireless network enabling scheduling requests. The wireless communication device sends at least one scheduling request to the wireless network to request uplink radio resources for sending additional data. The wireless communication device receives a second signaling message from the wireless network disabling scheduling requests. Subsequently, the wireless communication device resumes sending data over the logical channel without sending an additional scheduling request to the wireless network while scheduling requests are disabled. In some embodiments, the wireless communication device receives a third signaling message from the wireless network setting a logical channel scheduling request mask (LogicalChannelSR-Mask) for the logical channel. In some embodiments, the wireless network operates in accordance with a Long Term Evolution (LTE) wireless communication protocol, and the logical channel supports communication for a voice over LTE (VoLTE) connection.

In an embodiment, a method to reduce scheduling requests by a wireless communication device transmitting data over dynamically scheduled resources includes the following steps. A base station of a wireless network dynamically schedules uplink radio resources for the wireless communication device to enable the wireless communication device to send data over a logical channel. The base station sends at least one resource grant to the wireless communication device without requiring the wireless communication device to send scheduling requests for transmitting data over the logical channel to the base station. The base station receives data sent by the wireless communication device over the logical channel. The base station detects a gap in data transmission over the logical channel and sends a first signaling message to the wireless communication device enabling scheduling requests in response to detecting the gap in data transmission. The base station receives a scheduling request from the wireless communication device requesting uplink radio resources to send data over the logical channel. The base station sends a second signaling message to the wireless communication device disabling scheduling requests in response to resumption of transmission of data over the logical channel by the wireless communication device.

In an embodiment, a method to reduce scheduling requests by a wireless communication device transmitting data over dynamically scheduled resources includes the following steps. The wireless communication device receives a first signaling message from a wireless network including a configuration to set a logical channel scheduling request mask (LogicalChannelSR-Mask) for a logical channel. The wireless communication device delays transmission of a scheduling request to the wireless network for a delay time period in an instance in which data is available to be sent on the logical channel and uplink radio resources on which to send the data have not been granted by the wireless network. The wireless communication device utilizes the grant to send at least a portion of the data to the wireless network in an instance in which a grant is received from the wireless network within the delay time period. The wireless communication device sends a scheduling request to the wireless network to request uplink radio resources on which to send the data to the wireless network over the logical channel in an instance in which a grant is not received from the wireless network within the delay time period.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
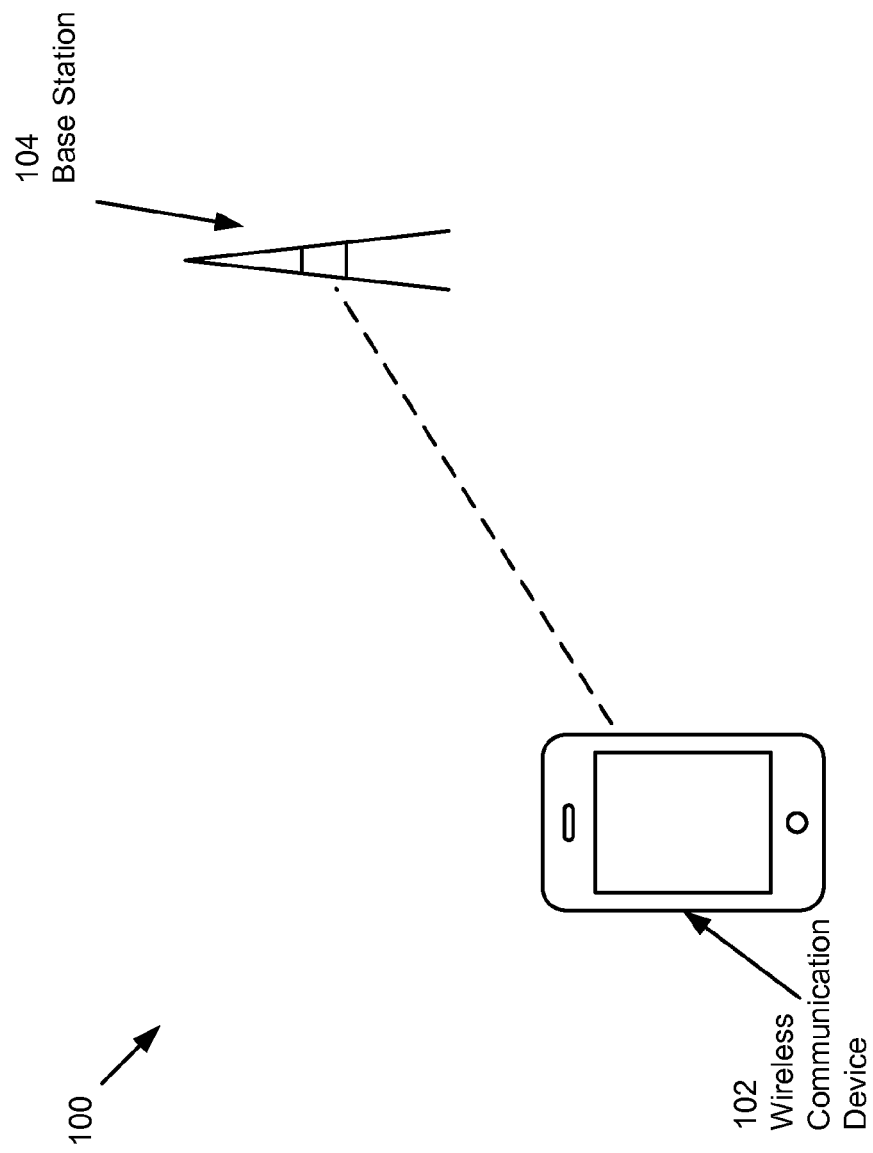
FIG. 1 illustrates a wireless communication system in accordance with some example embodiments.

Representative applications of the systems, methods, apparatuses, and computer program products disclosed herein are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for reducing scheduling requests (SRs) issued by a wireless communication device to a wireless network when transmitting voice data using dynamically scheduled resources provided by the wireless network. In this regard, some example embodiments provide for configuration of a logical channel scheduling request mask (LogicalChannelSR-Mask) that provides for disabling scheduling requests (SRs) for one or more logical channels, such as a logical voice channel, while still providing for communicating SRs for one or more additional logical channels, such as a logical data channel and/or a logical signaling channel. Accordingly, the amount of SRs that can be sent by a wireless communication device to the wireless network when transmitting voice data over a logical channel using dynamically scheduled resources can be reduced.

In a representative embodiment, the wireless communication device establishes a voice connection with an LTE wireless network using a voice over LTE (VoLTE) protocol to generate and send voice packets at regular intervals (e.g., when there is speech to send in the uplink direction). For example, voice packets can be generated at 20 ms time intervals and sent every 20 ms (individually) or can be sent every 40 ms (grouped together into two packet units). With the frequent generation and transfer of voice packets from the wireless communication device, rather than submit a scheduling request (SR) for each voice packet to the wireless network, which would add unnecessarily to the signaling load of the wireless network, the VoLTE connection can be established with semi-persistent scheduling (SPS), e.g., as defined in the LTE Release 8 (and following) TS 36.321 and TS 36.331 wireless communication protocol specifications. The wireless network can communicate a "reconfiguration" message, e.g., through Radio Resource Control (RRC) signaling, to the wireless communication device during the VoLTE connection establishment that includes SPS configuration information. The use of SPS for the VoLTE connection can be "activated" by the wireless network by providing a separate SPS Activate signaling message on a physical downlink control channel (PDCCH). Once the SPS Activate signaling message is received by the wireless communication device, the previously provided SPS configuration information can be used by the wireless communication device to determine when radio resource grants are scheduled by the wireless network for the VoLTE connection to transport voice packets in an uplink direction to the wireless network. The SPS Activate message can be communicated after the VoLTE connection is established and after the wireless network determines that an active voice connection exists using the VoLTE connection, e.g., after receipt of a scheduling request (SR) for the VoLTE connection from the wireless communication device. With SPS activated, the wireless network does not need to send explicit grant signaling messages on the PDCCH to the wireless communication device as radio resources are "pre-assigned" to the wireless communication device.

Wireless communication devices support the use of both voice connections and data connections simultaneously in some wireless networks. The wireless communication device can continue to monitor the PDCCH for uplink grants associated with "non-voice" connections that use dynamic scheduling, even when SPS is configured for a concurrent voice connection. The wireless network can uses SPS for a VoLTE connection, while also using dynamic scheduling (i.e., scheduling of radio resources on an "as needed" basis in response to SRs received from the wireless communication device) for other connections between the wireless communication device and the wireless network, e.g., for a data connection running in parallel with the VoLTE voice connection. Thus, SPS need not replace dynamic scheduling for all parallel connections between the wireless communication device and the wireless network and instead can be applied to a specific connection, e.g., a particular voice connection. Even for a given voice connection on which SPS is configured and activated, the wireless communication device can optionally request resources dynamically to use for the voice connection, e.g., in circumstances when a pre-scheduled grant can be unavailable. For example, with voice communications, the wireless communication device can expect to receive an acknowledgement (ACK) message for each voice packet communicated to the wireless network. In an instance when the wireless network communicates a negative acknowledgement (NACK) message instead to the wireless communication device, e.g., when the voice packet fails a cyclic redundancy check (CRC) or another transmission error occurs, the wireless communication device can submit an SR to request resources on which to re-transmit the previously transmitted voice packet that was received with an error at the wireless network. Thus, dynamic scheduling can exist in parallel with SPS on the same voice connection between the wireless communication device and the wireless network. The LTE Release 9 (and following) Technical Specification (TS) 36.321 and TS 36.331 wireless communication protocol specifications include a mechanism to disable the use of dynamic scheduling for a particular logical channel, in particular to avoid the use of SRs for voice packets and instead configure the logical channel to wait for SPS grants rather than trigger an SR when uplink data is available for communication to the wireless network. In general, voice packets can be transmitted on different logical channels from data packets and from signaling messages. The wireless network can configure a "Logical Channel SR Mask" on a "per logical channel" basis for each logical channel between the wireless communication device and the wireless network. If the Logical Channel SR Mask is configured for a particular logical channel on which voice packets are communicated, then SRs are not triggered for pending voice packets on the logical channel, but rather the wireless communication device waits for an SPS grant to communicate the pending voice packets over the particular logical channel on which the Logical Channel SR Mask is configured.

In a representative embodiment, when a wireless network uses dynamic scheduling for a voice connection, e.g., for a VoLTE connection, instead of using SPS to provide radio resources to support the voice connection, the wireless network can seek to minimize the amount of SRs generated by the wireless communication device. Continuous "full" use of dynamic scheduling by the wireless communication device for the voice connection would require the wireless communication device to repeatedly submit SRs to the wireless network and receive grants in response from the wireless network, which would waste signaling resources, particularly on the physical uplink control channel (PUCCH) on which the SRs are submitted to the wireless network and on the physical downlink control channel (PDCCH) on which the grants are provided by the wireless network. In some instances, the wireless network can provide grants to the wireless communication device based on a frequency of voice packet communication received from the wireless communication device, e.g., initially requiring use of SR dynamic scheduling but then halting the use of SR dynamic scheduling after ascertaining an appropriate frequency with which to provide grants to the wireless communication device. The wireless network can provide grants at regular intervals (as can be done for SPS) during voice communication in the uplink direction and stop providing grants when the wireless communication device does not provide any voice packet data in response to the grants, e.g., during a "silent" or "listening" time period during which no uplink voice packets are communicated from the wireless communication device to the wireless network. Upon resumption of voice traffic in the uplink direction, the wireless communication device can request a grant using a dynamically scheduled SR, and the wireless network can resume sending grants on a periodic basis to the wireless communication device during the remainder of the "talk" time period.

In a representative embodiment, the wireless network can configure a communication link, e.g., a logical channel that supports voice communication or VoLTE packet communication between a wireless communication device and the wireless network, to use dynamic scheduling of grants of radio frequency resources rather than semi-persistent scheduling (SPS). The wireless communication device can delay transmission of an SR to the wireless network for the logical channel for a length of time indicated by the wireless network. A value for the length of time to delay sending the SR can be provided by the wireless network to the wireless communication device, e.g., upon establishment of the logical channel and/or in a reconfiguration message. The wireless network, in some embodiments, can recognize that the logical channel is used for voice communication (or for another type of communication for which "regular" packet transmissions can be expected). The wireless network can provide grants to the wireless communication device in anticipation of voice packets, e.g., without being restricted to using a fixed SPS configuration, but also not requiring the wireless communication device to dynamically request grants for every uplink packet on which to transport data (e.g., voice packets) for the logical channel. In an embodiment, the wireless network provides for predictive scheduling of grants to the wireless communication device for uplink transmission.

To provide for flexibility in the use of dynamic scheduling of radio resource grants, in some embodiments, the wireless network can communicate a signaling message, e.g., as part of a medium access control (MAC) control element (CE), to enable or disable use of scheduling requests (SRs) for a particular logical channel (or set of logical channels) by the wireless communication device. In an embodiment, a logical channel configured for dynamic scheduling (and not configured for SPS) can be additionally configured to enable and/or disable the use of SR using the signaling message (MAC CE) provided by the wireless network. In some embodiments, SR enablement and disablement applies to any logical channel that is not configured for SPS and for which a Logical Channel SR Mask is set. In some embodiments, SR enablement and disablement applies to a specific logical channel, e.g., specified in the signaling message. In an embodiment, when SR is enabled (as indicated by a signaling message from the wireless network) for a logical channel (or for a set of logical channels) for which additionally SPS is not configured, scheduling requests (SRs) can be communicated from the wireless communication device to the wireless network for the logical channel (or for the set of logical channels) irrespective of whether a Logical Channel SR Mask is set or not set by the wireless network, i.e. a value for the Logical Channel SR Mask can have no meaning in this instance when SPS in snot configured and SR is enabled. In an embodiment, when SR is disabled (as indicated by a signaling message from the wireless network) for a logical channel (or a set of logical channels) for which SPS is not configured, scheduling requests (SRs) will not be communicated by the wireless communication device to the wireless network for those logical channels on which the Logical Channel SR Mask is configured.

In an embodiment, when uplink data is available for a logical channel for which a Logical Channel SR Mask is configured, scheduling requests can be delayed for a time period set by the wireless network, e.g., a number of milliseconds or seconds or other particular set time period. When no uplink grants have been assigned to the logical channel for the particular time period while uplink data is pending, the wireless communication device can initiate sending a scheduling request (or use a random access channel procedure if no SR is possible) to obtain radio resources on which to communicate the pending uplink data. A value for the particular time period (delay time period) can be signaled by the wireless network at a radio resource control (RRC) level, e.g., using an RRC signaling message. In an embodiment, the value for the delay time period equals or exceeds an expected, actual, or predicted inter-arrival time for uplink grants provided by the wireless network to the wireless communication device. In an embodiment, the value for the delay time period equals or exceeds an expected, actual or predicted time interval between voice packets generated by the wireless communication device. In an embodiment, the value for the delay time period equals or exceeds an expected, actual or predicted time interval between voice packet transmissions by the wireless communication device to the wireless network.

As described further herein, the wireless communication device can delay sending a scheduling request (SR) to the wireless network in certain circumstances because the wireless communication device can expect that a grant will be provided by the wireless network, e.g., at a regular periodic rate. The wireless communication device can maintain multiple logical channels with the wireless network in parallel, each logical channel used to support different types of traffic with different priorities, e.g., signaling messages having a highest priority, voice traffic having a next priority level, and data traffic having a lowest priority level. The wireless communication device can de-prioritize sending the SR for a logical channel that uses dynamic scheduling under certain circumstances. When a Logical Channel SR Mask is set for a logical channel and also configured for dynamic scheduling, the SR can be delayed by at least a time amount specified by the wireless network in a reconfiguration message, e.g., by 30 milliseconds or by 60 milliseconds. The delay time can correspond to a time period equal or longer than used for voice packet generation, voice packet transmission, uplink grants, or other periodic time period. For example, the time period can be longer than a 20 millisecond or a 40 millisecond time interval that can occur between consecutive voice packets (or pairs of voice packets) in an uplink direction during a voice connection. Rather than send an SR immediately upon generation of a voice packet, e.g., upon reception of the voice packet from a higher layer process, (or upon recognition that a voice packet is pending), the wireless communication device can delay sending the SR until after a time period that exceeds the normal inter-arrival time of uplink grants from the wireless network. For example, when the wireless network configures SPS or otherwise sends grants to the wireless communication device every 20 milliseconds, the wireless communication device can delay sending an SR for 30 milliseconds to wait for an expected uplink grant to be received from the wireless network. When the grant is received, the wireless communication device can discard (or otherwise cancel) a pending SR, which can be not required when an uplink grant is received from the wireless network. When no uplink grant is received during the delay time period, the wireless communication device can send the SR to the wireless network in order to ensure that the pending voice packet is transmitted.

Voice connections can include interspersed time periods of uplink transmission (voice packets generated at the wireless communication device), time periods of downlink transmission (voice packets provided by the wireless network to the wireless communication device), and "silent" time periods (no transmission of voice packets in either direction). During a "silent" time period or during a "listening" time period, the wireless communication device does not generate data to send in the uplink direction, and therefore no uplink grants can be required by the wireless communication device for the voice connection. Following the "silent" or "listening" time period, the wireless communication device can generate voice packets for uplink transmission, and an SR can be sent by the wireless communication device after the delay time period when no uplink grants are received. The delay time period can be sufficiently short to ensure that a requisite quality of service for the voice connection is achieved. The delay time period can be sufficiently long to ensure that after an SR is sent and regular uplink grants resume, the wireless communication device does not need to send additional SRs. In an embodiment, the wireless communication device provides an explicit signaling message (different from an SR) to indicate to the wireless network the start of voice traffic in an uplink direction for a voice connection. The explicit signaling message can be sent by the wireless communication device to the wireless network after each silent/listening time period, e.g., at or before the start of an uplink voice traffic time period. The explicit signaling message can be not used during the uplink voice traffic time period. In an embodiment, a second explicit signaling message can be sent to indicate the end of an uplink voice traffic time period (rather than waiting for the wireless network to detect a silent/listen time period). In some embodiments, a Logical Channel SR Mask can be set for a particular logical channel, e.g., one that carries voice traffic and is configured to use dynamic scheduling, during a "talk" time period, to avoid use of the SR during the "talk" time period, and the Logical Channel SR Mask can be disabled during a "silent" or "listen" time period, to permit use of the SR when voice traffic restarts at the end of the "silent" or "listen" time period. In some embodiments, the wireless network determines when the wireless communication device is in a "silent" or "listen" time period based on a lack of uplink voice packets that would normally be transmitted at a periodic regular rate during a "talk" time period on the logical channel for the voice connection. In some embodiments, when the wireless network detects the start of a "silent" or "listen" time period, the wireless network can send an explicit signaling message, e.g., a particular medium access control (MAC) protocol data unit (PDU) to the wireless communication device to enable the use of SR on one, some, or all logical channels. When the wireless communication device enters a "talk" time period, the wireless communication device can send an SR to request radio resources, which the wireless network can detect and then subsequently resume providing grants to the wireless communication device for uplink transmission (without requiring the wireless communication device to continue to send SRs during the "talk" time period). In some embodiments, the wireless network sends a particular MAC PDU or other explicit signaling message to disable the use of SR during the "talk" time period. In some embodiments, the wireless network detects the start of a "silent" or "listen" time period when at number of uplink grants provided to the wireless communication device are not used, e.g., when at least one uplink grant is not used or when at least two successive uplink grants are not used.

As described herein, a Logical Channel SR Mask can be provided for each logical channel to enable or disable use of SR on the logical channel. The Logical Channel SR Mask can be used for logical channels that are configured for SPS or for logical channels that are configured for dynamic scheduling of grants. The Logical Channel SR Mask configuration can be extended to include a mask timer delay value that can specify a length of a time period that the wireless communication device can delay sending an SR to the wireless network, e.g., to wait for a grant, and when no grant is received during the time period the delayed SR can be sent. As different network operators can use different time intervals between successive grants for SPS or for predictive scheduling, e.g., grants can be spaced 20 milliseconds or 40 milliseconds apart, the mask timer delay value can be provided to the wireless communication device by the wireless network. In an embodiment, the mask timer delay value can be greater than the nominal time between grants for the wireless network. In some embodiments, the mask timer delay can be used by the wireless communication device only when the SR mask is set for the logical channel. The embodiments described herein can be applied equally to voice communication, to video communication or to combinations thereof.

FIG. 1 illustrates an example system 100 that includes a wireless communication device 102 that can communicate with a serving base station 104 of a serving network (e.g., a wireless network) in accordance with some example embodiments. By way of non-limiting example, the wireless communication device 102 can be a cellular phone, such as a smart phone device, a tablet computing device, a laptop computing device, or other computing device configured to access a network via the base station 104. In some embodiments, such as those in which the base station 104 is an evolved node B (eNB) providing access to an LTE wireless network, the wireless communication device 102 can also be referred to as user equipment (UE).

The base station 104 can be any type of cellular base station depending on a radio access technology (RAT) implemented by a wireless network that can be accessed via the base station 104. By way of non-limiting example, the base station 104 can be an evolved node B (eNB), a node B, a base transceiver station (BTS), and/or any other appropriate type of base station depending on the RAT implemented on the wireless network.

In some example embodiments, the base station 104 can provide access to, and the wireless communication device 102 can be configured to access, a wireless network implementing a RAT allowing for the transmission of packet switched voice data. For example, the base station 104 can provide access to a wireless network using a fourth generation (4G) cellular communications RAT, such as a RAT implementing an LTE technology, such as LTE or LTE-Advanced (LTE-A). However, it will be appreciated that some embodiments can be applied in existing and/or future-developed wireless networks that can use a non-LTE, or even a non-4G RAT. As such, it will be appreciated that where some example embodiments are described with respect to LTE technology, that description is provided by way of a non-limiting example of some embodiments.

Figure 2:
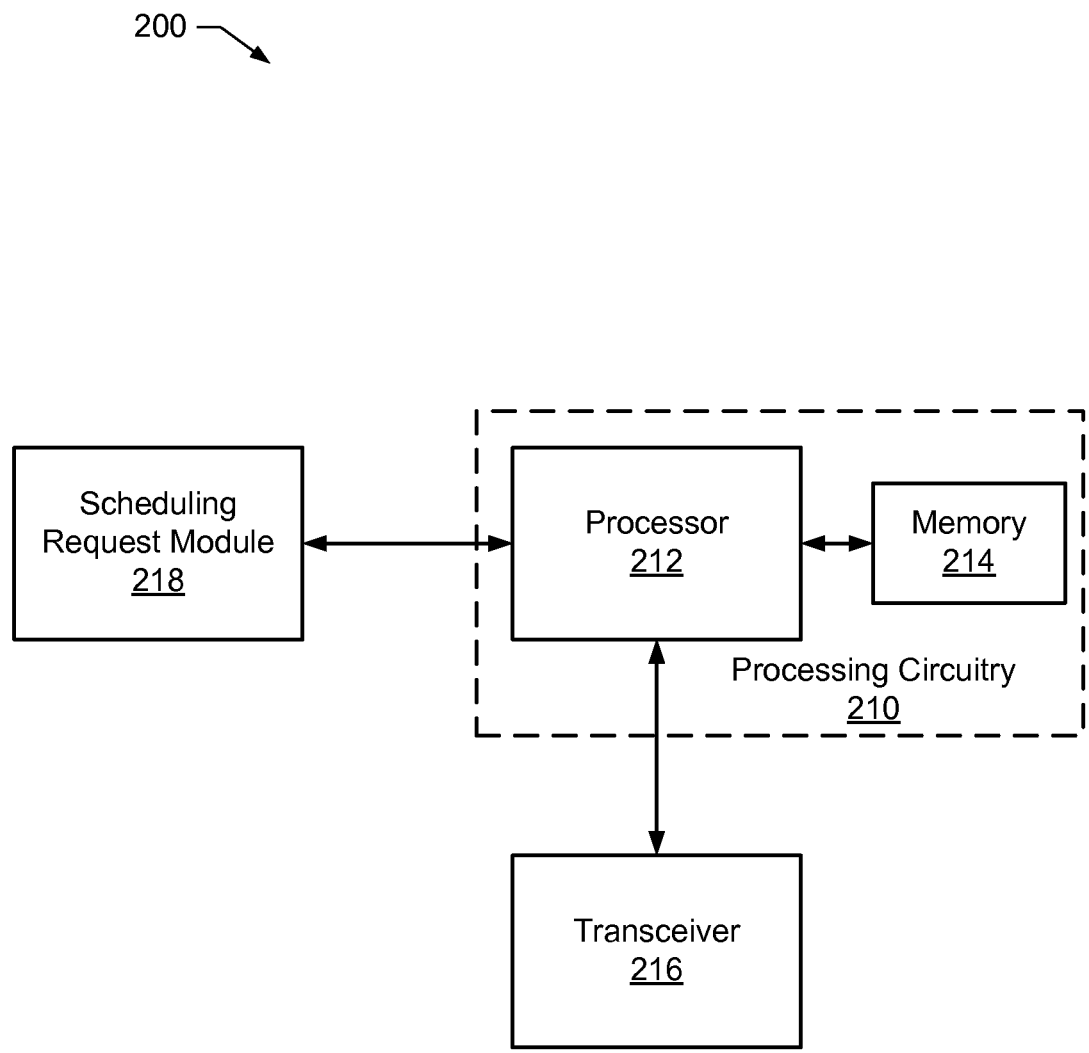
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset configured to enable a computing device to operate using one or more radio access technologies. In some example embodiments, the processing circuitry 210 can include a processor 212 and, in some embodiments, such as that illustrated in FIG. 2, can further include memory 214. The processing circuitry 210 can be in communication with or otherwise control wireless circuitry 216 and/or a scheduling request module 218.

The processor 212 can be embodied in a variety of forms. For example, the processor 212 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, wireless circuitry 216, or scheduling request module 218 via a bus(es) for passing information among components of the apparatus 200.

The apparatus 200 can further include wireless circuitry 216. The wireless circuitry 216 can enable the apparatus 200 to send wireless signals to and receive signals from one or more wireless networks. As such, the wireless circuitry 216 can be configured to support communication between the wireless communication device 102 and base station 104 in accordance with a RAT that can be used by the base station 104. As such, the wireless circuitry 216 can be configured to support any type of cellular or other wireless communication technology that may be implemented by the base station 104. The wireless circuitry 216 in the apparatus 200 can include one or more wireless circuitry modules including processors and specific wireless components to transmit and receive wireless signals according to various wireless communication protocols. A wireless circuitry module (which can also be referred to as a wireless subsystem, a transceiver, a signal chain, or a radio in some embodiments) of the apparatus 200 can include transmitters and receivers to provide signal processing of radio frequency wireless signals formatted according to wireless communication protocols, e.g., according to an LTE wireless communication protocol, a Code Division Multiple Access (CDMA) 2000 1× wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components.

The apparatus 200 can further include scheduling request module 218. The scheduling request module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the scheduling request module 218. It should be noted that scheduling request module 218 is not responsible for modifying or adjusting scheduling as scheduling parameters are typically determined by a base station or network entity as described below.

Figure 3:
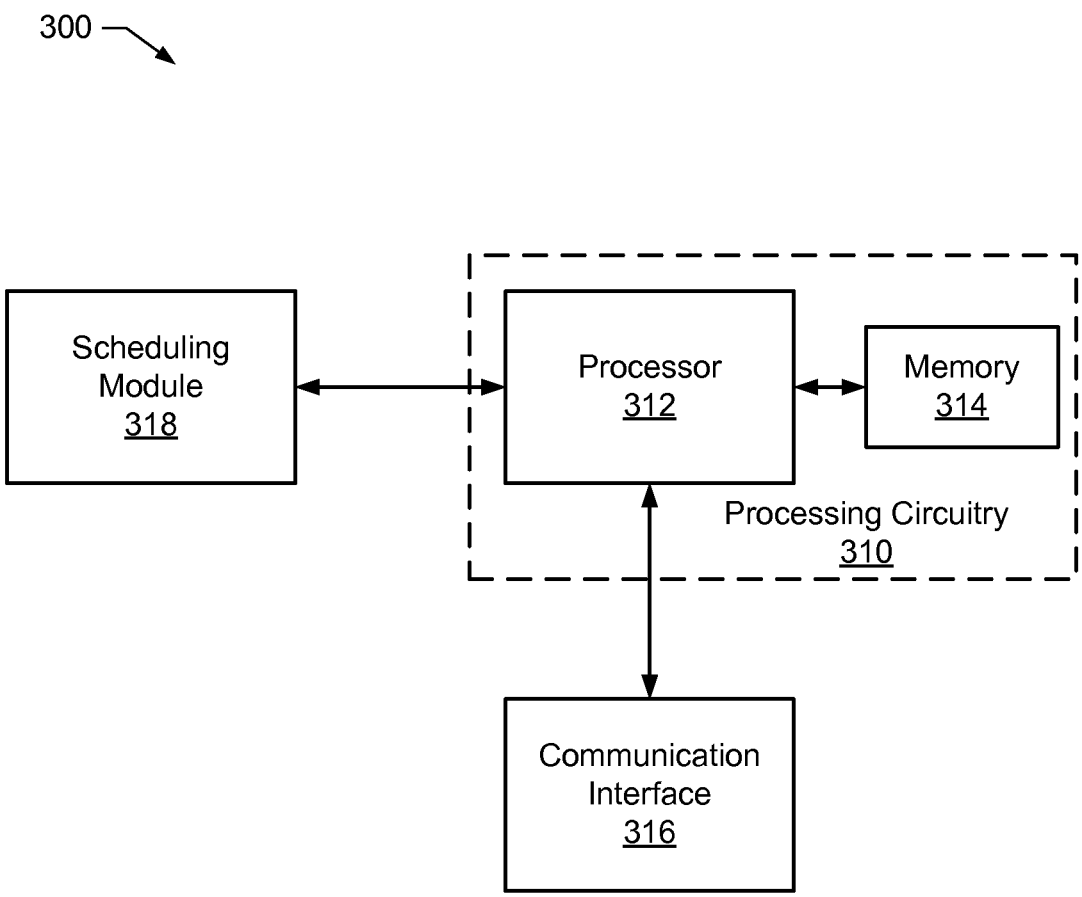
FIG. 3 illustrates a block diagram of an apparatus that can be implemented on a network entity in accordance with some example embodiments.

FIG. 3 illustrates a block diagram of an apparatus 300 that can be implemented on a base station 104 and/or other network entity in accordance with some example embodiments. In this regard, the apparatus 300 can be implemented on one or more network entities that can control resource scheduling for the wireless communication device 102 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing scheduling functionalities of the base station 104 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset.

In some example embodiments, the processing circuitry 310 can include a processor 312 and, in some embodiments, such as that illustrated in FIG. 3, can further include memory 314. The processing circuitry 310 can be in communication with or otherwise control a communication interface 316 and/or scheduling module 318.

The processor 312 can be embodied in a variety of forms. For example, the processor 312 can be embodied as various processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In embodiments including a plurality of processors, the processors can be implemented on a single computing device, or can be distributed across a plurality of computing devices that can be collectively configured to provide functionality of the apparatus 300 in accordance with some example embodiments. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. In embodiments including multiple memory devices, the memory devices can be implemented on a single computing device, or can be distributed across a plurality of computing devices that can be collectively configured to provide functionality of the apparatus 300 in accordance with some example embodiments. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, communication interface 316, or scheduling module 318 via a bus(es) for passing information among components of the apparatus 300.

The apparatus 300 can further include a communication interface 316. The communication interface 316 can be configured to enable the apparatus 300 to communicate with one or more wireless communication devices 102. For example, the communication interface 316 can include wireless circuitry enabling communication with one or more wireless communication devices 102 in a cell that can be served by a base station on which the apparatus 300 can be at least partially implemented. The communication interface 316 can additionally or alternatively include one or more interface mechanisms for enabling communication with other devices and/or networks. As such, the communication interface 316 can include, for example, an antenna (or multiple antennas) and supporting hardware and/or software for enabling communications with a wireless communication network (e.g., a cellular network, WSN, and/or the like) and/or a communication modem or other hardware/software for supporting communication via cable, digital subscriber line (DSL), universal serial bus (USB), Ethernet or other wire-line networking methods. The communication interface 316 can accordingly be configured to enable communication between the base station 104 and one or more further network entities that can, for example, support resource scheduling for a wireless communication device 102.

The apparatus 300 can further include scheduling module 318. The scheduling module 318 can be embodied as various means, such as circuitry, hardware, a computer program product comprising computer readable program instructions stored on a computer readable medium (for example, the memory 314) and executed by a processing device (for example, the processor 312), or some combination thereof. In some embodiments, the processor 312 (or the processing circuitry 310) can include, or otherwise control the scheduling module 318.

In some example embodiments, the wireless communication device 102 can be configured to transmit voice data (e.g., packet switched voice data) on a logical voice channel to a serving network via the base station 104. The base station 104 and/or other wireless network entity can be configured to dynamically schedule uplink resources for the logical voice channel for the wireless communication device 102. In addition to the logical voice channel, the wireless communication device 102 can transmit packets on one or more further logical channels, such as by way of non-limiting example, a logical signaling channel, logical data channel, and/or other logical channel. In this regard, traffic can be divided in some example embodiments based at least in part on traffic type into a plurality of logical channels.

The scheduling module 318 can be configured in some example embodiments to provide the wireless communication device 102 with a configuration setting of a "Logical Channel SR Mask" for one or more logical channels. Without loss of generality, the Logical Channel SR Mask can be labeled as a LogicalChannelSR-Mask hereinafter. For example, a LogicalChannelSR-Mask can be set for a logical voice channel. In this regard, the LogicalChannelSR-Mask can set for the logical voice channel to trigger the wireless communication device 102 to avoid sending an SR (with the exception of some circumstances described further herein in accordance with some example embodiments) even when dynamic scheduling is used to assign grants to the wireless communication device 102. Accordingly, some example embodiments provide for application of a LogicalChannelSR-Mask to control SR transmission behavior of the wireless communication device 102 when dynamic scheduling is used for one or more logical channels between the wireless communication device 102 and a wireless network.

In some example embodiments, the scheduling module 318 can be configured to use signaling to dynamically turn ON/OFF scheduling requests (SRs) for a logical channel for which a LogicalChannelSR-Mask has been set. In some example embodiments, medium access control (MAC) layer signaling can be used to turn ON/OFF SR for a logical channel. For example, some example embodiments provide a MAC protocol data unit (PDU) that can be sent to the wireless communication device 102 to enable or disable SR.

In embodiments in which a MAC PDU is used to support signaling to turn ON/OFF SR for a logical channel for which a LogicalChannelSR-Mask has been set, an SR Command MAC control element can be identified by a MAC PDU sub-header having a predefined Logical Channel ID (LCID). For example, in some example embodiments, Table 6.2.1-1 of the ETSI TS Section 36.321 wireless communication protocol specification can be modified to define LCID values that provide for MAC PDU signaling to turn ON/OFF SR for a logical channel in accordance with some example embodiments.

| Index | LCID Values |
|---|---|
| 0 | CCCH (Common Control Channel) |
| 00001-01010 | Identity of the logical channel |
| 11010 | SR Command |
| 11011 | Activation/Deactivation of SR |
| 11100 | UE Contention Resolution Identity |
| 11101 | Timing Advance Command |
| 11110 | DRX (Discontinuous Receive) Command |
| 111111 | Padding |

In some example embodiments, a MAC PDU that can be used to turn ON/OFF SR can be defined to include the following sequence of fields. The SR command status field can provide for enabling and disabling SR for a particular logical channel identified by the logical channel ID (or in some embodiments for all logical channels for which an SR mask is set.)

| Reserved | Reserved | SR Command Status (SS) | Logical channel ID |
|---|---|---|---|
| Logical channel ID | | | Logical channel ID |
| Logical channel ID | | | Logical channel ID |
| Logical channel ID | | | Logical channel ID |
| Logical channel ID | | | Logical channel ID |

In this regard, a single PDU can be used to enable or disable SR for a particular logical channel, or for a plurality of identified logical channels IDs.

As another example, a MAC PDU that can be used to turn ON/OFF SR can be defined to include the following elements.

| Reserved | Reserved | SR Command Status (SS) |
|---|---|---|

In the above example MAC PDUs, the "Reserved" fields can be reserved bits, which can be set to "0." The SS (SR Command status) field can be used to enable and to disable SR for one or more logical channels specified by logical channel ID(s).

In some embodiments that use signaling to dynamically turn ON/OFF SR, when the wireless communication device 102 receives a signaling message that disables use of SRs and a LogicalChannelSR-Mask has also been set, the scheduling request module 218 in the wireless communication device 102 can be configured to recognize disabling of SR as being applicable to one or more particular logical channel(s) that are configured with the LogicalChannelSR-Mask. In some embodiments, SRs can be sent for a logical channel(s) for which a LogicalChannelSR-Mask has not been set. If, however, the wireless communication device 102 receives a signaling message that enables SR, an SR configuration that can be received by the wireless communication device 102, such as through Radio Resource Control (RRC) signaling, can apply to all logical channels, and the LogicalChannelSR-Mask can be ignored.

In some embodiments, SR can be disabled (e.g., through signaling described herein) for the wireless communication device 102 while the wireless communication device 102 sends voice data on a logical voice channel for which a LogicalChannelSR-Mask has been set. In this regard, the scheduling module 318 can be configured to dynamically schedule uplink resources for the wireless communication device 102 without requiring the wireless communication device 102 to send an SR while voice data continues to be received over the logical voice channel. Accordingly, for example, the scheduling module 318 can be configured to periodically send uplink resource grants to the wireless communication device 102 that can be used by the wireless communication device 102 for voice data transmission in the uplink direction. In some embodiments, the scheduling module 318 can send the uplink resource grants at a periodic rate or with a regular inter-arrival time without semi-persistent scheduling being configured for the logical voice channel.

In the event that there is a pause in uplink voice data transmission over the logical voice channel, the scheduling module 318 can be configured to detect the pause in the voice data transmission. For example, the scheduling module 318 can be configured to detect a pause in voice data transmission by the wireless communication device 102 in an instance in which the scheduling module 318 has sent a predefined number of scheduling grants for uplink transmission without receiving voice data from the wireless communication device 102 over the logical voice channel. In some embodiments, the wireless communication device 102 can explicitly communicate a signaling message to the wireless network indicating a start or an end to a voice data transmission time period. In response to a pause in voice data transmission, the scheduling module 318 can be configured to cease sending scheduling grants to the wireless communication device 102 and can send a signaling message, such as a MAC PDU, that enables SR to the wireless communication device 102.

In an instance in which the wireless communication device 102 receives a signaling message that indicates enabling SR in response to a pause in voice data transmission and the wireless communication device 102 has additional voice data to send (e.g., after the pause), the scheduling request module 218 of the wireless communication device 102 can be configured to send an SR to the wireless network to request uplink radio resources on which to send the additional voice data. As voice data transmission resumes following the pause, the scheduling module 318 in the wireless network can send a signaling message, such as a MAC PDU, to the wireless communication device 102 to disable SR for the logical channel. Accordingly, after the pause in voice data transmission, the wireless communication device 102 can resume sending voice data over the logical voice channel without sending additional SRs, while SR is disabled.

As described for example embodiments herein, a quantity, frequency, or number of SRs used for a logical channel can be reduced when dynamic scheduling is used by disabling SRs during periods of active voice transmission such that the wireless network can continue to dynamically grant uplink radio resources for uplink voice data transmission until a pause in the voice transmission is detected. The use of SR can then be enabled in response to the pause in voice data transmission and, when the wireless communication device 102 has additional voice data to send following the pause, the wireless communication device 102 can send an SR to request resources to resume transmission of voice data on the logical voice channel. The quantity, frequency, or number of SRs can be thereby reduced, as a minimal number of SRs are used only to restart an active voice time period following an inactive "silent" or "listening" voice time period during a voice connection.

Figure 4:
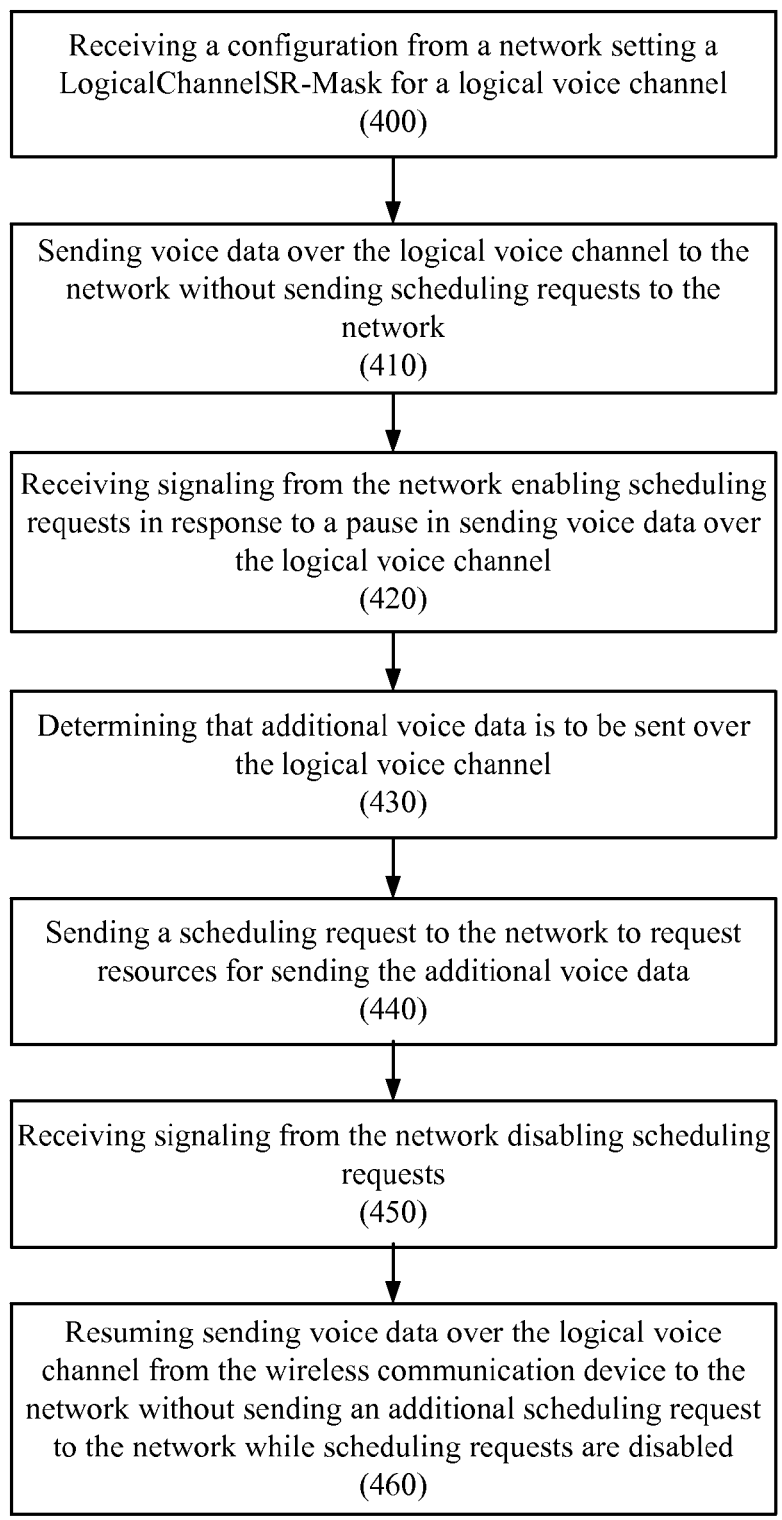
FIG. 4 illustrates a flowchart of operations that can be performed by a wireless communication device in accordance with an example method for reducing scheduling requests by a wireless communication device transmitting voice data over dynamically scheduled resources according to some example embodiments.

FIG. 4 illustrates a flowchart of operations that can be performed by a wireless communication device 102 in accordance with an example method for reducing scheduling requests by the wireless communication device 102 transmitting voice data using dynamically scheduled resources according to some embodiments in which SR is turned ON/OFF. In this regard, FIG. 4 illustrates operations that can be performed by the wireless communication device 102 in accordance with some embodiments. One or more of processing circuitry 210, processor 212, memory 214, transceiver 216, or scheduling request module 218 can, for example, provide means for the operations illustrated in and described with respect to FIG. 4. Operation 400 can include the wireless communication device 102 receiving a configuration from a wireless network, which sets a LogicalChannelSR-Mask for a logical voice channel. Operation 410 can include the wireless communication device 102 sending voice data over the logical voice channel to the wireless network without sending SRs to the wireless network. SR can be disabled while operation 410 is ongoing. Operation 420 can include the wireless communication device 102 receiving signaling from the wireless network enabling SRs in response to a pause in sending voice data over the logical voice channel. Operation 430 can include the wireless communication device 102 determining that additional voice data is to be sent over the logical voice channel. Operation 440 can include the wireless communication device 102 sending an SR to the wireless network to request resources for sending the additional voice data. Operation 550 can include the wireless communication device 102 receiving signaling from the wireless network disabling SR (e.g., in response to the SR sent in operation 440 and/or in response to resumption of sending voice data). Operation 460 can include the wireless communication device 102 resuming sending voice data over the logical voice channel from the wireless communication device to the wireless network without sending an additional SR to the wireless network while SRs are disabled. In this regard, the wireless network can resume granting uplink radio resources without requiring the wireless communication device to send SRs for voice data transmission while SRs are disabled.

Figure 5:
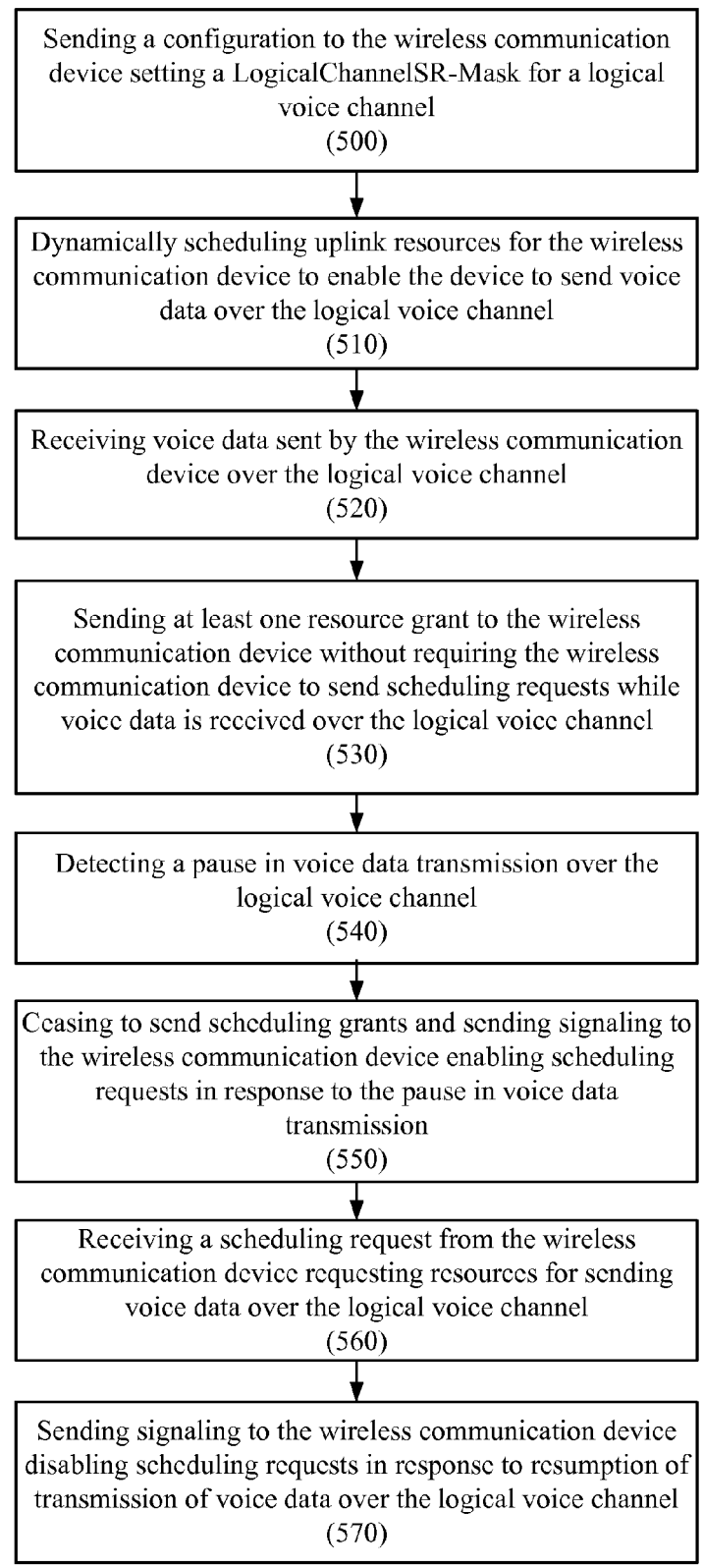
FIG. 5 illustrates a flowchart of operations that can be performed by a network entity in accordance with an example method for reducing scheduling requests by a wireless communication device transmitting voice data over dynamically scheduled resources according to some example embodiments.

FIG. 5 illustrates a flowchart of operations that can be performed by a wireless network entity, such as a base station 104, in accordance with an example method for reducing scheduling requests by a wireless communication device 102 transmitting voice data over dynamically scheduled resources according to some embodiments in which SR is turned ON/OFF. In this regard, FIG. 5 illustrates operations that can be performed by the apparatus 300 in accordance with some embodiments. One or more of the processing circuitry 310, processor 312, memory 314, communication interface 316, or scheduling module 318 can, for example, provide means for the operations illustrated in and described with respect to FIG. 5. Operation 500 can include sending a configuration to the wireless communication device 102 setting a LogicalChannelSR-Mask for a logical voice channel. Operation 510 can include dynamically scheduling uplink resources for the wireless communication device 102 to enable the wireless communication device 102 to send voice data over the logical voice channel. Operation 520 can include receiving voice data sent by the wireless communication device 102 over the logical voice channel. Operation 530 can include sending at least one radio resource grant to the wireless communication device 102 without requiring the wireless communication device 102 to send SRs while voice data is received over the logical voice channel. Operation 540 can include detecting a pause in voice data transmission over the logical voice channel. Operation 550 can include ceasing to send radio resource grants and sending signaling to the wireless communication device 102 enabling SRs in response to the pause in voice data transmission. Operation 560 can include receiving a scheduling request from the wireless communication device 102 requesting resources for sending voice data over the logical voice channel. Operation 570 can include sending signaling to the wireless communication device 102 disabling scheduling requests in response to resumption of transmission of voice data over the logical voice channel.

Some embodiments provide for reducing scheduling requests by a wireless communication device 102 transmitting data over a logical channel for which a LogicalChannelSR-Mask is configured and for which resources are dynamically scheduled by delaying sending an SR in an instance in which data at the wireless communication device 102 is available to be sent on the logical channel and uplink resources for sending the data have not been granted by the wireless network to the wireless communication device 102. In this regard, the scheduling request module 218, in some embodiments, can be configured to wait for a defined delay period before sending an SR to see if the wireless network sends a grant to the wireless communication device 102 within the delay period. Accordingly, if a radio resource grant is received by the wireless communication device 102 within the delay period, then the granted radio resources can be used to send at least a portion of the voice data that is available to be sent to the wireless network, and the wireless communication device 102 can avoid sending an SR to request radio resources for the at least a portion of the voice data. If, however, a radio resource grant is not received within the delay period, then the scheduling request module 218 of the wireless communication device 102 can send an SR to the wireless network to request uplink radio resources for sending the data on the voice channel in the uplink direction to the wireless network. If an uplink radio resource grant is not received from the wireless network by the wireless communication device 102 within the delay period and if SR is not configured at all for the wireless communication device 102, the scheduling request module 218 can initiate a Random Access Channel (RACH) procedure.

In some embodiments, using a delay time period, the scheduling request module 218 of the wireless communication device 102 can be configured to set and/or restart a timer having a time duration value that corresponds to the delay period if data is available for a logical channel for which a LogicalChannelSR-Mask is configured. If an uplink radio resource grant is not received prior to timer expiry, then the scheduling request module 218 can send an SR to the wireless network.

The delay period can, for example, be defined based at least in part on a periodicity with which the scheduling module 318 can issue uplink radio resource grants to the wireless communication device 102. In some embodiments, the length of the delay period can be configured for the wireless communication device 102 by the wireless network through a delay time period configuration that can be sent to the wireless communication device 102. For example, the scheduling module 318 can be configured to send configuration signaling, such as by means of one or more RRC signaling messages, to the wireless communication device 102 that includes a delay period configuration. In some embodiments, the scheduling module 318 can be configured to send a LogicalChannelConfig information element (IE) to the wireless communication device 102, the LogicalChannelConfig IE including a configuration for a LogicalChannelSR-MaskTimer, which defines the delay period. A representative LogicalChannelConfig information element is defined as follows.

```
LogicalChannelConfig ::= SEQUENCE {
    ul-SpecificParameters SEQUENCE {
        priority INTEGER (1..16),
        prioritisedBitRate ENUMERATED {
            kBps0, kBps8, kBps16, kBps32, kBps64, kBps128,
            kBps256, infinity, spare8, spare7, spare6,
            spare5, spare4, spare3, spare2, spare1},
        bucketSizeDuration ENUMERATED {
            ms50, ms100, ms150, ms300, ms500, ms1000, spare2,
            spare1},
        logicalChannelGroup INTEGER (0..3) OPTIONAL -- Need OR
    } OPTIONAL, -- Cond UL
    ....,
    [[ logicalChannelSR-Mask-r9 ENUMERATED {setup} OPTIONAL
    ]]
    LogicalChannelSR-MaskTimer ENUMERATED
        (ms20,ms25,ms30,ms40,ms45,ms50,ms500,ms1000}  OPTIONAL
        -- Cond logChannelSR-Mask
}
```

Figure 6:
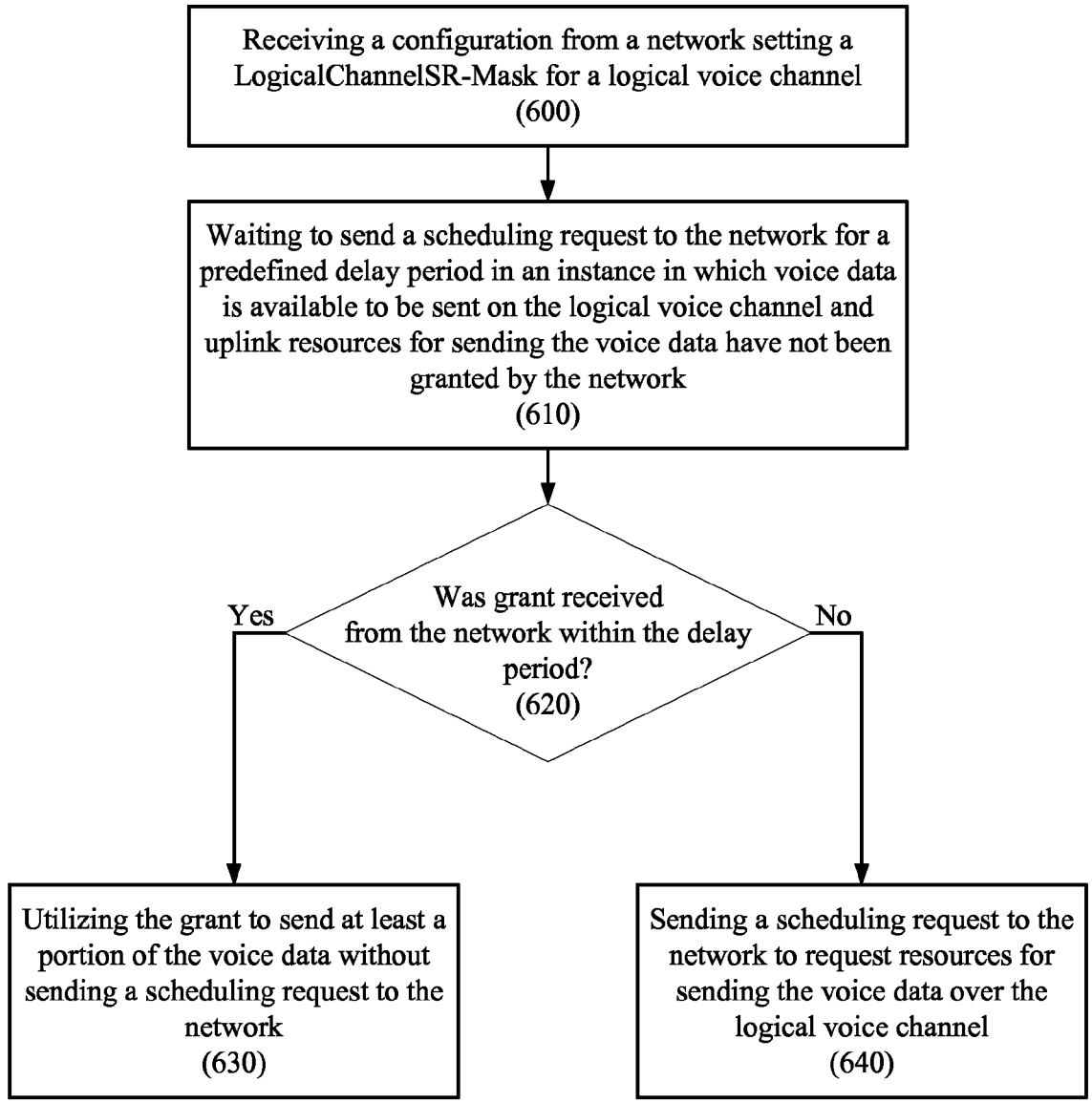
FIG. 6 illustrates a flowchart of operations that can be performed by a wireless communication device in accordance with another example method for reducing scheduling requests by a wireless communication device transmitting voice data over dynamically scheduled resources according to some example embodiments.

FIG. 6 illustrates a flowchart of operations that can be performed by a wireless communication device 102 in accordance with another example method for reducing scheduling requests by a wireless communication device 102 transmitting voice data over dynamically scheduled resources according to some embodiments in which sending an SR can be delayed for a delay period. One or more of the processing circuitry 210, processor 212, memory 214, transceiver 216, or scheduling request module 218 can, for example, provide means for the operations illustrated in and described with respect to FIG. 6. Operation 600 can include the wireless communication device 102 receiving a configuration from a wireless network, which sets a LogicalChannelSR-Mask for a logical voice channel. Operation 610 can include the wireless communication device 102 waiting to send a scheduling request to the wireless network for a predefined delay period in an instance in which voice data is available to be sent on the logical voice channel and uplink resources for sending the voice data have not been granted by the wireless network. The delay period can be a time period defined by the wireless network through a signaling message provided to the wireless communication device 102. Operation 620 can include the wireless communication device 102 determining whether a grant was received from the wireless network within the delay period. In an instance in which it is determined at operation 620 that a grant was received from the wireless network within the delay period, the method can proceed to operation 630, which can include the wireless communication device 102 utilizing the grant to send at least a portion of the voice data without sending a scheduling request to the wireless network. When, however, it is determined at operation 620 that a grant is not received from the wireless network within the delay period, the method can proceed to operation 640, which can include the wireless communication device 102 sending a scheduling request to the wireless network to request resources for sending the voice data over the logical voice channel.

Figure 7:
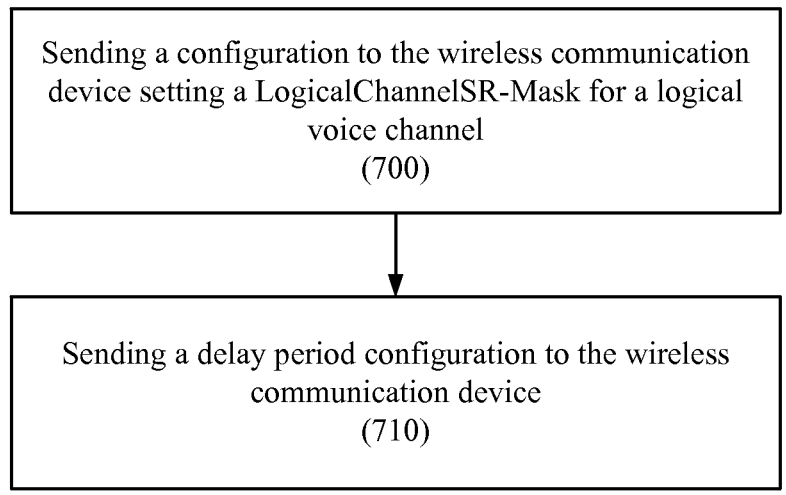
FIG. 7 illustrates a flowchart of operations that can be performed by a network entity in accordance with another example method for reducing scheduling requests by a wireless communication device transmitting voice data over dynamically scheduled resources according to some example embodiments.

FIG. 7 illustrates a flowchart of operations that can be performed by a wireless network entity, such as a base station 104, in accordance with another example method for reducing scheduling requests by a wireless communication device 102 transmitting voice data over dynamically scheduled resources according to some embodiments in which sending an SR can be delayed for a delay period. In this regard, FIG. 7 illustrates operations that can be performed by the apparatus 300 in accordance with some embodiments. One or more of the processing circuitry 310, processor 312, memory 314, communication interface 316, or scheduling module 318 can, for example, provide means for the operations illustrated in and described with respect to FIG. 7. Operation 700 can include sending a configuration to the wireless communication device 102, the configuration setting a LogicalChannelSR-Mask for a logical voice channel. Operation 710 can include sending a delay period configuration to the wireless communication device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium for controlling a wireless communication device or wireless network entity. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method to reduce scheduling requests sent to a wireless network by a wireless communication device when configured by the wireless network to use dynamically scheduled resources for a logical channel, the method comprising:

by the wireless communication device:
sending data to the wireless network over the logical channel using uplink radio resources assigned in grants provided by the wireless network without sending scheduling requests to the wireless network for the logical channel, when transmission of scheduling requests for the logical channel by the wireless communication device to the wireless network is disabled by the wireless network;

receiving from the wireless network a first signaling message that enables transmission of scheduling requests for the logical channel, wherein the first signaling message is different than a resource message containing information that specifies a resource grant to the wireless communication device;

sending to the wireless network at least one scheduling request that requests uplink radio resources for sending additional data to the wireless network, after receiving the first signaling message;

receiving from the wireless network a second signaling message that disables transmission of scheduling requests for the logical channel; and resuming sending data to the wireless network over the logical channel using uplink radio resources assigned in grants provided by the wireless network without sending to the wireless network scheduling requests for the logical channel, while transmission of scheduling requests for the logical channel is disabled.

2. The method as recited in claim 1, wherein a logical channel scheduling request mask (LogicalChannelSR-Mask) for the logical channel is set to provide for enabling and disabling transmission of scheduling requests for the logical channel.

3. The method as recited in claim 1, wherein the wireless network operates in accordance with a Long Term Evolution (LTE) wireless communication protocol, and wherein the logical channel supports communication for a voice over LTE (VoLTE) connection.

4. The method as recited in claim 1, wherein the first and second signaling messages include a first field that indicates enabling or disabling transmission of scheduling requests for the logical channel and a second field that identifies the logical channel.

5. The method as recited in claim 1, wherein the first and second signaling messages include a field that indicates enabling or disabling transmission of scheduling requests for all logical channels of the wireless communication device for which a logical channel scheduling request mask (LogicalChannelSR-Mask) is set.

6. The method as recited in claim 1, wherein the wireless communication device receives, during a gap in transmission of data in an uplink direction, the first signaling message that enables transmission of scheduling requests.

7. The method as recited in claim 6, wherein the gap in transmission of data in the uplink direction corresponds to a pause in a voice communication by a user of the wireless communication device.

8. A method to reduce scheduling requests sent by a wireless communication device to a wireless network over a connection that uses dynamically scheduled resources, the method comprising:

by a base station of the wireless network:

dynamically scheduling uplink radio resources for the wireless communication device to enable the wireless communication device to send data over a logical channel;

sending at least one resource grant to the wireless communication device to transmit data over the logical channel to the wireless network without requiring the wireless communication device to send scheduling requests to receive the at least one resource grant to transmit data over the logical channel when transmission of scheduling requests for the logical channel by the wireless communication device to the wireless network is disabled;

receiving data sent by the wireless communication device over the logical channel using uplink radio resources assigned in the at least one resource grant;

detecting a gap in data transmission sent by the wireless communication device over the logical channel;

sending to the wireless communication device a first signaling message that enables transmission of scheduling requests for the logical channel in response to detecting the gap in data transmission, wherein the first signaling message is different than a resource message containing information that specifies a resource grant to the wireless communication device;

receiving from the wireless communication device a scheduling request that requests uplink radio resources to send data over the logical channel; and sending to the wireless communication device a second signaling message that disables transmission of scheduling requests for the logical channel in response to resumption of transmission of data over the logical channel by the wireless communication device.

9. The method as recited in claim 8, wherein a logical channel scheduling request mask (LogicalChannelSR-Mask) for the logical channel is set to provide for enabling and disabling transmission of scheduling requests for the logical channel.

10. The method as recited in claim 8, wherein the wireless network operates in accordance with a Long Term Evolution (LTE) wireless communication protocol, and wherein the logical channel supports communication for a voice over LTE (VoLTE) connection.

11. The method as recited in claim 8, wherein the first and second signaling messages include a first field that indicates enabling or disabling transmission of scheduling requests for the logical channel and a second field that identifies the logical channel.

12. The method as recited in claim 8, wherein the first and second signaling messages include a field that indicates enabling or disabling transmission of scheduling requests for all logical channels of the wireless communication device for which a logical channel scheduling request mask (LogicalChannelSR-Mask) is set.

13. A method to reduce scheduling requests sent to a wireless network by a wireless communication device configured to transmit data over dynamically scheduled resources, the method comprising:

by the wireless communication device:

receiving from the wireless network a first signaling message that includes a configuration to set a logical channel scheduling request mask (LogicalChannelSR-Mask) that provides for enabling and disabling transmission of scheduling requests for a logical channel;

delaying transmission of a scheduling request to the wireless network for a delay time period in an instance in which data is available to be sent on the logical channel and uplink radio resources on which to send the data have not been granted by the wireless network, wherein the delay time period is based on a periodicity for scheduling grants by the wireless network for semi-persistent scheduling (SPS), and wherein the delay time period is longer than a time period used for voice packet transmission;

in an instance in which a grant is received from the wireless network within the delay time period, utilizing the grant to send at least a portion of the data to the wireless network; and in an instance in which a grant is not received from the wireless network within the delay time period, sending a scheduling request to the wireless network to request uplink radio resources on which to send the data to the wireless network over the logical channel.

14. The method as recited in claim 13, further comprising:

receiving from the wireless network a second signaling message that includes a value for the delay time period.

15. The method as recited in claim 13, wherein the first signaling message includes a first field that indicates enabling or disabling transmission of scheduling requests for the logical channel and a second field that identifies the logical channel.

16. The method as recited in claim 13, wherein the first signaling message includes a field that indicates enabling or disabling transmission of scheduling requests for all logical channels of the wireless communication device for which a logical channel scheduling request mask (LogicalChannelSR-Mask) is set.

17. The method as recited in claim 13, wherein the wireless network operates in accordance with a Long Term Evolution (LTE) wireless communication protocol, and the logical channel supports communication for a voice over LTE (VoLTE) connection.

18. The method as recited in claim 13, further comprising initiating a random access channel (RACH) procedure when no grant is received from the wireless network within the delay time period and the logical channel is not configured for dynamic scheduling requests.

19. The method as recited in claim 14, wherein the value for the delay time period equals or exceeds an expected or actual inter-arrival time between successive data packets for a voice connection.

20. The method as recited in claim 19, wherein the logical channel is not configured for semi-persistent scheduling (SPS) by the wireless network.

* * * * *